Jan. 6, 1948.                C. A. UPSON                2,433,965
PROCESS AND APPARATUS FOR MAKING LAMINATED BOARDS
Filed Aug. 23, 1940
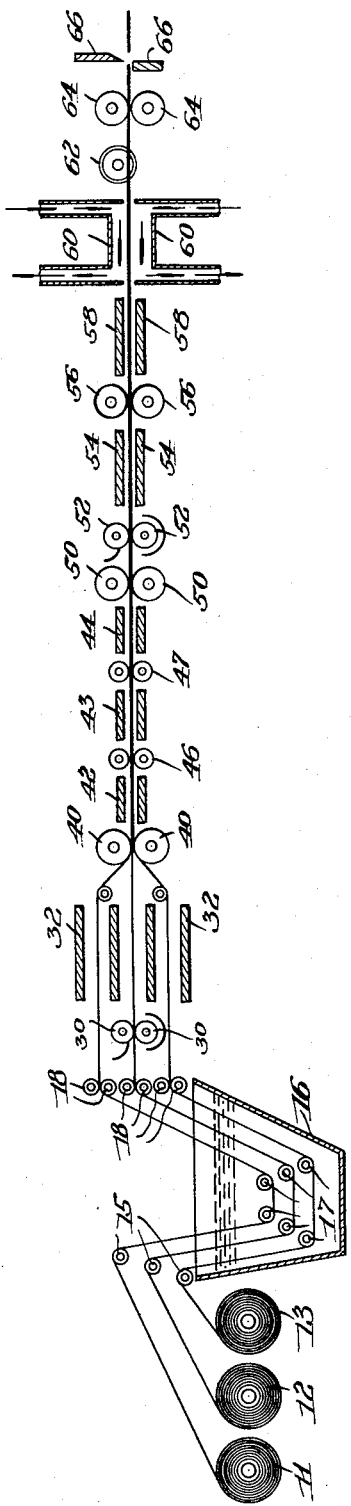
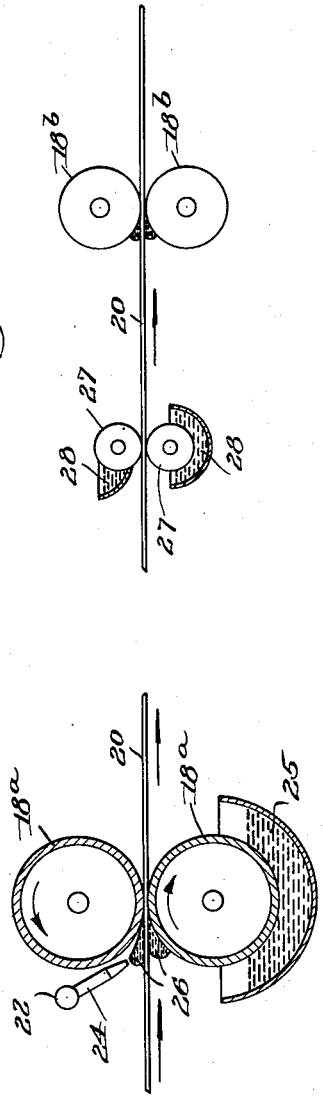
INVENTOR.
Charles A. Upson
BY Cumpston & Shepard
his Attorneys Patented Jan. 6, 1948

2,433,965

UNITED STATES PATENT OFFICE 2,433,965

PROCESS AND APPARATUS FOR MAKING LAMINATED BOARD

Charles A. Upson, Lockport, N. Y., assignor to The Upson Company, Lockport, N. Y., a corporation of New York Application August 23, 1940, Serial No. 353,855

15 Claims. (Cl. 154—46)

The present invention relates to the manufacture of a laminated board made of a plurality of plies, some or all of which are treated with resin for the purpose of impregnating, bonding, or coating such plies.

An object of the invention is the provision of an improved and simplified process and apparatus for making, inexpensively and efficiently, such a laminated board including resin in or on one or more of the plies.

Another object is the provision of a process and apparatus for making such board continuously as distinguished from an intermittent or "batch" process.

Still another object is the provision of a process and apparatus for impregnating a sheet with resin more efficiently and thoroughly than has been possible with prior processes and apparatuses.

Still another object is the provision of a process for making laminated board including resinous material, the steps of which process are so related to each other in timing and sequence that heat is conserved to the maximum degree, greatly reducing heat losses as compared with prior processes.

A further object is the provision of a process for making laminated board in which the various heat treatment steps are telescoped or overlapped with each other, greatly reducing the total time required for carrying out the complete process.

To these and other ends the invention resides in certain improvements and combinations of parts, all as will be hereinafter more fully described, the novel features being pointed out in the claims at the end of the specification.

In the drawings:

Fig. 1 is a diagrammatic longitudinal section through apparatus in accordance with one embodiment of the invention;

Fig. 2 is a fragmentary section through a modified arrangement, and

Fig. 3 is a fragmentary section through another modified arrangement.

The same reference numerals throughout the several views indicate the same parts.

The process and apparatus of the present invention can be best understood by referring to Fig. 1, which shows somewhat schematically the apparatus for carrying out the process. Any desired number of plies of material, to be combined to form the finished laminated board or sheet, may be employed, three plies being here illustrated simply as a convenient example. The plies are drawn from any suitable source of supply, such as the rolls 11, 12 and 13 of sheet material making up the plies. The plies may be of the same material and same dimensions, or may be different as to material or dimensions, depending on characteristics desired in the final product. Preferably most or all of the plies are of paper, textile fabric, or other fibrous material, and preferably but not necessarily are of fairly heavy caliper, 0.01 inch to 0.06 inch in thickness. Some of the plies may be of metal foil or other thin metal sheets if desired.

The plies are drawn over guide rolls 15 and down into a tank 16 containing a bath of impregnating material, around guide rollers 17 in this bath, and thence upwardly out of the bath and between pairs of power driven pressure rolls 18 which furnish the motive power for drawing the plies or webs up to this point against the action of frictional brakes of any known type applied to the supply rolls 11, 12, and 13 to keep the webs under a predetermined degree of tension.

The impregnating bath in the tank 16 is of resin, which may be either a natural gum or a synthetic resin, and may be in the form of a molten bath of thermo-plastic resin, or a solution or emulsion, in water or an organic solvent, of thermo-plastic resin or of heat-converting (thermo-setting) resin. In the preferred example, the impregnating material used in the tank is the material commercially known as "Vinsol" which is a residue of wood rosin derived by a solvent separation process. This material is melted and heated to a temperature of about 430° F., at which temperature it has sufficiently low viscosity so that it penetrates from about 0.005 to 0.02 inch into either face of paper board having a thickness of 0.03 inch to 0.06 inch, when drawn through the bath with an immersion time of twenty to fifty seconds. The bath may be kept at the proper temperature by a circulating hot oil jacket surrounding the tank 16 or by any other suitable heating means applied to or in the tank.

Emerging from the bath, the plies pass through the pressure rolls 18 as above stated, which rolls are heated to such degree as to maintain the resin, at the nip of the rolls, at a viscosity such that the excess resin from the surface of the sheet will build up as a dam or bead on the entering side of the nip, to restrain escape of resin from the interior of the partially saturated sheet or web as the latter is compressed on entering the nip. The degree of heat, if any, of the rolls 18 will depend, therefore, on the viscosity characteristics of the particular resin employed. For the above mentioned material "Vinsol," it is found that good results are achieved by heating the rolls 18 to a surface temperature in the neighborhood of 350° to 480° F., this warmth of the rolls being sufficient to avoid chilling of the resin and to maintain its fluidity and mobility within the sheet.

An important feature is the pressure exerted by the rolls 18 against the sheet or web passing between them. The exact pressure employed is subject to some variation, depending upon the thickness and density of the sheet, the character of the fibers used in the sheet, and the character and viscosity of the saturating agent, but ordinarily excellent results are obtained if the nip pressure between the rolls is of the order of 100 pounds or more per lineal inch of the width of the sheet passing between the rolls.

In the prior art of saturation of sheets in the manufacture of roofing felt, for example, the saturating agent has usually been an asphalt or tar product, and saturation has usually been best carried out when the sheet to be saturated has a major percentage of cotton, wool, or jute fibers, and only a minor percentage of wood fibers. Such a sheet and such a saturating agent are not suitable for making a rigid, dense board of the type which can be made by the present invention. Impregnation with a suitable resin for the manufacture of a rigid, dense board is much more difficult than impregnation with asphalt or tar such as used in roofing felt, and this is more especially true if the sheet to be impregnated be made of a major percentage of wood fiber, which is more suitable for the manufacture of a rigid, dense board than the cotton, wool, or jute fibers largely used in impregnated roofing felts. One expedient which has been adopted in an effort to overcome the difficulties of impregnating a wood fiber sheet with resinous material, when the sheet is of substantial caliper or thickness, has been to dilute the resinous material to make it of very low solids concentration, but this is uneconomical because of the greater amount of water or other solvent which must subsequently be driven off from the sheet, a process wasteful both as to heat and as to material.

By the use of the high pressure rolls of the present invention, however, saturation may be readily accomplished on a sheet of relatively high density, made mainly or wholly from wood fibers and having only a small percentage of cotton, wool, or jute fibers, or none at all, and using a saturating agent such as the "Vinsol" resinous material above mentioned, in relatively high concentration. A sheet of this character having a thickness or caliper of, say, 0.06 of an inch, and having such density as to give it a weight of about 145 pounds per thousand square feet, cannot be impregnated or saturated uniformly throughout its thickness by a reasonably high concentration of the "Vinsol" resin or similar resinous materials, simply by dipping the sheet briefly into a bath of saturating material at atmospheric pressure or at the low hydrostatic head provided by a few feet of dip into a tank. Even where the time of immersion is increased, a point is reached where full penetration of saturant into the sheet does not take place. But where the sheet, after dipping, or after application of the saturant to the surface of the sheet as explained below, is then passed through the high pressure squeeze rolls mentioned, excellent results are attained and the sheet can be saturated or impregnated thoroughly all the way to its center.

As already stated, the degree of pressure to be used for satisfactory impregnation will vary with the thickness and the density of the sheet, and the character of the fibers used in the sheet, as well as with the character of the impregnating resin and its viscosity characteristics at the temperature employed, and with the speed of travel through the squeeze rolls. To give a concrete example, a sheet of the paper type (that is, made mainly or entirely from wood fibers or fibers from old newspaper stock) having a weight of the order of 145 pounds per thousand square feet in a thickness or caliper of 0.06 of an inch, which is dipped briefly in a bath of the above mentioned "Vinsol" resin at a temperature of about 400 to 425° F., can be thoroughly impregnated to the center of the sheet by passing the sheet, as it emerges from the bath of "Vinsol," between heated squeeze rolls having a surface temperature about the same as that of the "Vinsol" bath, and having a diameter of about 14 to 16 inches, at an operating speed of about 25 to 50 lineal feet of travel of the sheet per minute, the rolls producing a nip pressure on the sheet of approximately 400 pounds per lineal inch of contact line across the width of the sheet. Lower pressures are satisfactory if the paper is of lower density or of less thickness, or if the viscosity of the saturating material is reduced. As already stated, the invention contemplates use of any squeeze roll pressure of about 100 pounds or more per lineal inch, depending on viscosity, density, thickness, speed of travel, diameter of the squeeze rolls, and such factors.

The passage of the resin-carrying sheet between the high pressure squeeze rolls has the effect not only of distributing the resin substantially uniformly throughout the thickness of the sheet, but also of greatly shortening the required time of immersion of the sheet in the resin bath with consequent great advantages in permissible speed of the machine and reduction in the size of the bath tank 16. In fact, when using a sheet of high porosity and a resin or resin dispersion having fairly good wetting or permeability properties, it is possible, by employing these high pressure squeeze rolls 18, to eliminate entirely the actual dipping of the sheet into a bath of resin and to obtain thorough and uniform saturation of the sheet with the resin simply by passing the dry sheet into the nip of the squeeze rolls through a flood or "bead" or "pond" of the impregnating agent lying on the sheet at the entrance to the rolls. For instance, the arrangement may be somewhat as shown schematically in Fig. 2, where the squeeze rolls 18 are here designated by the numeral 18a, the web 20 passing through the rolls in the direction of the arrows. The resin, at the proper temperature and in molten form, is supplied to the top surface of the sheet through the transverse supply pipe 22 having a series of nozzles or outlets 24 spaced at intervals across the sheet to discharge the material onto the sheet close to the entrance to the rolls, and is supplied to the bottom surface of the sheet by having the lower roll dip into a bath 25 of the resin. The resin builds up ponds or lakes 26 on both surfaces of the moving sheet, the rear edge of each pond being kept close to the rolls by the forward movement of the sheet. The ends of the ponds, at the side edges of the sheet, are held in place by suitable dams, not shown.

An alternative arrangement is shown in Fig. 3 of the drawings, where the squeeze rolls are indicated at 18b. The resin is applied to both surfaces of the sheet by the applicator rolls 27 located slightly in advance of the squeeze rolls and bearing relatively lightly against the sheet, each applicator roll being supplied with resin as at 28.

In addition to reducing the required time of immersion, or even eliminating any actual dipping or immersion (as in Figs. 2 and 3) the use of the high pressure squeeze rolls permits saturation to a degree of completeness and uniformity which simply cannot be attained by immersion alone, no matter for how long a time continued.

The reasons why the high pressure squeeze rolls produce this satisfactory impregnation are somewhat obscure, but the following explanation is offered as a tentative hypothesis. It seems probable that the high degree of pressure of the rolls produces a high hydrostatic pressure in the fluid resin in that portion of the sheet directly in the nip of the rolls, causing it to be forced into the interior of the sheet. At the same time, the fibrous sheet is somewhat compressed when passing through the rolls, so that the central part of the sheet, previously incompletely saturated, is wetted by resin displaced from those portions of the sheet nearer the surface, thus completing the saturation. As the compressed sheet leaves the nip of the rolls, there is some tendency for it to expand again to its original thickness, and this expansion may have a tendency to suck or distribute the molten resin more uniformly through the sheet. The bead or pond of excess material built up on the surface of the sheet at the entering side of the nip helps to restrain the escape of resin from the already saturated portions of the sheet near the surfaces thereof and to force its displacement into the portions closer to the center of the sheet as the latter is compressed and as the hydrostatic pressure is developed within the sheet on entering the nip.

If all of the plies are to be impregnated with the same resin, they may all be passed through the same bath or tank 16, as indicated in Fig. 1. When, however, different plies are to be differently impregnated, each ply can be separately passed through an individual tank or bath of resin of the required kind, or either of the arrangements already described in connection with Figs. 2 or 3 may be employed, feeding the appropriate kind of resin to each individual web.

After passing through the high pressure squeeze rolls, the ply or plies other than those which are to form the outer surface of the finished board, are passed through adhesive applicator rolls 30, to apply any suitable adhesive to the surfaces of these sheets. In the preferred form, this adhesive is a solution or emulsion of a heat-curing or thermosetting resin, which upon further treatment will become a bonding or cementing film to unite the plies to each other.

The plies are further advanced, approximately in parallelism with each other, past and under the influence of suitable heating means indicated schematically at 32 which may be in the form of heated platens, or a heated tunnel, or means for supplying radiant heat from infra-red lamps, for example. If no further heat treatment of the impregnating resin is needed at this point, the outer plies may pass around rather than through the heating means, so that only the inner ply or plies, to which the bonding resin was applied by the rolls 30, will be subjected to the heat at this point.

This heat drives off the solvent from the resin applied at 30, and performs the further and important function of raising the temperature of the dried film of resin (after the solvent has been driven off) so that this dried film enters its thermo-plastic stage and is held at this thermoplastic temperature for a short time, during which its cure advances, its tackiness increases, and its melting point is raised toward the infusibility stage. If a thermosetting resin rather than a thermo-plastic resin is used as the impregnating material, the heat applied at 32 will also help to advance or complete the setting of this impregnating resin, the cure of which may have been started by the heat of the squeeze rolls 18, 18a, or 18b.

Before the cure of the thermo-setting coating resin is completed and while it is still in a tacky state, the plies of material are brought together and passed through the combining rolls 40 to press the plies firmly against each other. These combining rolls, like the squeeze rolls 18, have a nip exerting substantial pressure on the product, of the order of about 50 to 250 pounds per lineal inch across the width of the material, to insure squeezing out the heavy bodied bonding resin to a uniform thin film such as is desired for making a good bond. A nip pressure of about 200 pounds per lineal inch of contact line gives good results. The combining rolls may advantageously be heated, to advance further the cure of the bonding resin at the instant the plies are brought together.

From the combining rolls 40, the plies, now united with each other, pass forwardly through the additional heating means 42, 43, and 44, to advance the cure of the resin not necessarily completed by the heating means 32 and 40, and through the supporting and advancing rolls 46 and 47, to the tension rolls 50, driven in synchronism with or preferably slightly faster than the combining rolls 40 to maintain the material under tension at all times as it passes from the rolls 40 to the rolls 50. The supporting and advancing rolls 46 and 47 may be power driven, or may be idle rolls simply turning under the influence of the movement of the board, but in either event they preferably exert sufficient pressure on the faces of the board to insure maintenance of contact between the plies. When the cure of the resin has been sufficiently advanced before reaching these rolls so that there is little or no further vapor to be driven off, the pressure of these rolls may be quite light, as for example merely the pressure caused by the weight of a hollow roll. When, however, the process is so operated that the cure is less far advanced when these rolls are reached, so that further vapor is still to be driven off and there is danger of blowing the plies apart by vapor pressure, then the rolls should operate at higher pressures depending upon the amount of vapor pressure likely to occur within the sheet, the roll pressure in such cases frequently being of the order of 100 pounds per lineal inch of contact line across the width of the sheet.

The pressure produced by these rolls (any desired number of sets of which may be used) in combination with the tension produced by the tension rolls 50, is effective in holding the plies of paper and the adhesive films in undisturbed relationship to each other during the final curing or setting of the resinous adhesive, partly from the retained heat already in the board and partly from the influence of the heating means 42, 43, and 44, which heating means may be of any of the forms above mentioned in connection with the heating means 32. The rolls 50 may also be heated, if desired, as also the rolls 46 and 47.

From the tension rolls 50, the moving board next passes between the applicator rolls 52 which apply, to both surfaces of the board, a coating of any desired finishing material to form the finished surface of the final board. This finishing material is preferably, like the material applied by the rolls 30, a thermo-setting or heat-curing resin, although it is not necessarily the identical kind of resin applied by the rolls 30 but may differ from it in various characteristics. For instance, since it is to form the outer surface of the board, it may have a higher luster or be more resistant to solvents or to abrasion than the resin used for bonding purposes and applied by the rolls 30.

After the application of the surface coating at 52, the board proceeds through other heating means 54, which may be of any of the forms above mentioned in connection with the heating means 32, these heating means 54, together with the residual heat already contained in the board, serving to advance the cure or setting of the resin applied at 52, preferably to the point where the solvent or vapor is driven off and where the final setting or curing is partially completed. Then, preferably after the resin coating has lost its tackiness but while it is still slightly plastic and not quite finally set, the board passes between the finishing rolls 56, preferably chromium plated, or made of stainless steel, or otherwise treated at their faces to avoid sticking to the plastic resin coating. If a smooth finished surface is desired on the board, these finishing rolls 56 are preferably ground and polished to present smooth surfaces, while if it is desired to have the final surface of the board made with an egg shell finish, or embossed, the rolls 56 may be correspondingly formed to produce the desired surface finish on the board. In some cases, two or more sets of finishing rolls may be desirable, the first set of rolls serving to smooth the surface coating of resin uniformly over the surface of the board and the subsequent set or sets of rolls serving to emboss one or both surfaces of the board with any desired design or finish.

Beyond the set or sets of finishing rolls 56, the board again passes through heating means 58 which, as before, may be of any of the forms or kinds mentioned in connection with the heating means 32. The heating means 58 serve to complete the heat treatment or cure of the surface coating, from the slightly plastic stage at which the coating passes through the finishing rolls, to the completely set and cured stage of the final product, the curing or setting being carried to any desired degree by making the heating means 58 of the proper length and supplyingg the proper amount of heat. The heating means 58 also completes the setting of the bonding resin if it has not already been completed before reaching this point, and the same is true of the impregnating or saturating resin if it is of a thermo-setting nature, rather than thermo-plastic.

After completion of the curing of the resin at 58, the board is finished except for cooling and cutting to size. It may conveniently be cooled by passage through a cool air blast chamber 60, to reduce the temperature to one which can be readily handled, after which the board may pass through edge trimmers and slitters 62 to trim off the lateral edges to exact size and to slit the wide board into two or more narrower strips of board, if desired, then passing on to pull rolls 64, power driven to drag the board forwardly to this point. Just beyond the pull rolls 64 may be a severing knife 66 of any suitable construction, for severing the continuous strip or strips of board into appropriate lengths.

The rolls 56 and 64 are driven either in synchronism with or preferably slightly faster than the rolls 50, just as the rolls 50 are driven in synchronism with or slightly faster than the rolls 40. By driving each successive set of main rolls slightly faster than the preceding set, the board is maintained under tension all the way from the rolls 40 to the final pull rolls 64, which greatly reduces the possibility of warping or creation of internal stresses within the board, during the various heating phases and the final cooling step at the cooling chamber 60.

It will be seen that the heating steps of this continuous process are so correlated with each other and with the progress of the board that great efficiency results. At the time when the plies pass through the heating means 32, they are separated from each other, so that the vapor driven off by the heat can readily escape laterally through the spaces between the plies, at atmospheric pressure, without having to pass through great resistance which would be offered if the plies were held under pressure in tight contact with each other. All or practically all of the vapor is preferably driven off before the plies are brought into contact with each other in the nip of the rolls 40, so that after the plies are actually pressed together, there preferably is practically no vapor yet to escape, with the result that there is little danger of "blowing" the plies or forming "blisters" between the plies due to presence of vapor under high pressure between the plies. In fact, when the process is operated in the preferred manner, the danger of vapor pressure building up between the plies after they are brought together is so slight that the plies may be held in proper relation to each other merely by using occasional sets of rolls 46 and 47 at intervals, instead of using continuous pressure over the whole area of the sheet, as has been necessary in some prior processes.

No cooling of the board takes place at any stage until the cooling chamber 60 is reached. The heat imparted to the paper strips or webs from passage through the bath 16 is not completely lost and wasted, but is conserved (except for slight loss by radiation into the surrounding atmosphere) so that less heat is required from the heating means 32 than would be needed if the sheets arrived at the heating means 32 in a cold state. The same is true during the further steps of the process, a considerable amount of residual heat remaining in the board after passage through each separate heating means or each set of heated rollers, to reduce the amount of heating required for the next stage or step of the process, thus making for great heat economy.

Another advantage of the present process, when operated in the preferred manner, is that the various heating stages or steps may be "telescoped" or overlapped with each other, thus resulting in greatly speeding up the process and shortening the length of machine required to carry it out. For instance, it is not necessary that the cure of the bonding resin shall be completed by the time the coating resin is applied, and the same heat used to cure the coating resin may serve to complete the cure of the bonding resin. Likewise, if a thermosetting resin, rather than the more usual thermoplastic resin, is used as the impregnating or saturating agent, it is not necessary that its cure be completed before the rolls 40 are reached, but its cure may be continued under the influence of the heating means 42, 43 and 44, and even the heating means 54 and 58, if necessary. Thus heat is conserved to a maximum extent, and put to double or multiple use. Some of the resin curing reactions are of an exothermic character, so that heat is not used up to any great extent. The need is mainly to subject the material to the proper heat environment for the proper time, rather than to supply large quantities of heat units.

Moreover, since the process is a continuous one, all areas of the board pass through exactly the same cycle, with exactly the same timing, and the heating may therefore be controlled much more accurately than is possible with a discontinuous process, and the resin can be brought much more closely to a critical heating point, at the time it passes from one portion of the process to another, than is possible in a discontinuous process where the possibility of an unexpected delay in transferring a sheet from one apparatus to another requires a greater "margin of safety" in the heat treatment of the resin.

Another advantage of the continuous process with the sheet remaining in a relatively hot state from the time it passes through the bath 16 until the time it reaches the cooling chamber 60, is that the hot condition of the sheet permits a dispersion of resin of higher solids concentration to be applied by the rolls 30 and 52, than would be possible if the sheet were cool at the time of application. In other words, the resin applied by the rolls 30 and 52, may have a considerably higher content or proportion of solids, and a lower proportion of water or solvent, than would be the case if applied to a cold sheet. This higher content of solids greatly reduces the amount of heating required to set or cure the resin, and permits the water or solvent to be driven off more quickly by heat, resulting in a faster process and in less soaking or penetration of these resins into the sheet, keeping them on the surface of the sheet where they are wanted, rather than wasting the binding or coating resins by penetration into the interior of the sheet where cheaper grades of resin will serve adequately for impregnation purposes.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

I claim:

1. The continuous process of making a laminated board from a series of sheets of paper-like fibrous material which includes the steps of impregnating all of said sheets with resinous material, maintaining the impregnated sheets in spaced relation to each other for a substantial time after impregnation, applying a binding coating of thermosetting resinous material to at least one of each two opposed surfaces of said sheets while they are travelling in spaced relation to each other, subjecting all of the binding coatings substantially simultaneously to substantially the same cycle of heating while the sheets are in spaced relation to each other, sufficient to advance the cure of all of said binding coatings substantially simultaneously to a tacky state, then bringing all of said sheets substantially simultaneously into contact with each other while said binding coatings are in said tacky state, pressing said sheets firmly together to cause them to be bound firmly to each other by said binding coatings to form the laminated board, and thereafter subjecting the board to further heat applied substantially symmetrically to both exposed faces of the board, sufficient to complete the thermosetting of the resinous material constituting said binding coatings, all of said steps being carried out while all of said sheets are advancing substantially continuously at a substantially uniform speed of travel.

2. The continuous process of making a laminated board from a plurality of sheets of fibrous material, comprising the steps of continuously advancing said sheets, treating said sheets with a resinous solution, subjecting said sheets separately to a pressure sufficient to force said solution into said sheets to impregnate the same throughout, applying a thermosetting resinous solution to at least one of each two opposing faces of each sheet, heating said sheets while maintained in spaced relation with one another sufficiently to advance the cure of said thermosetting solution to a tacky state and commence the setting thereof, combining said sheets under substantial pressure to form a board, and continuing the application of heat thereto to complete the thermosetting of said resinous material, all of said steps being accomplished while continuously advancing said sheets and board at a substantially uniform speed.

3. The continuous process of making a substantially rigid, laminated board from a plurality of flexible sheets of fibrous material, comprising the steps of continuously advancing said sheets, treating each sheet with a resinous solution, subjecting said sheets to a high roller pressure to force said solution into said sheets to impregnate the same and remove excess solution therefrom, applying a thermosetting resinous solution to at least one of each two opposing faces of each sheet, heating said sheets substantially simultaneously, while maintained in spaced relation one with another, sufficiently to advance the cure of said thermosetting solution to a tacky state and commence the setting thereof, combining said sheets under substantial pressure to form a board and continuing the application of heat thereto to complete the thermosetting of said resinous material and form a substantially rigid board, all of said steps being accomplished while continuously advancing said sheets and board at a substantially uniform speed.

4. The continuous process of making a laminated board from a plurality of sheets of fibrous material, comprising the steps of continuously advancing said sheets, treating each face of each sheet with a resinous solution, subjecting said sheets separately to a roller pressure of at least 100 pounds per lineal inch of width thereof to force said solution into said sheets to impregnate the same throughout and remove excess solution therefrom, applying a thermosetting resinous solution to at least one of each two opposing faces of each sheet, heating said sheets, while maintained in spaced relation with one another, sufficiently to advance the cure of said thermosetting solution to a tacky state and commence the setting thereof, combining said sheets by roller pressure of at least 50 pounds per lineal inch of width thereof to form a board, and continuing the application of heat thereto to complete the thermosetting of said resinous material, all of said steps being accomplished while continuously advancing said sheets and board at a substantially uniform speed.

5. The continuous process of making a laminated board from a plurality of sheets of fibrous material, comprising the steps of continuously advancing said sheets, treating each sheet with a molten resinous solution, subjecting said sheets separately to a high roller pressure to force said solution into said sheets to impregnate the same and remove excess solution therefrom, applying a molten thermosetting resinous solution to at least one of each two opposing faces of each sheet, heating said sheets, while maintained in spaced relation one with another, sufficiently to advance the cure of said thermosetting solution to a tacky state and commence the setting thereof, combining said sheets by roller pressure to form a board, and continuing the application of heat thereto to complete the thermosetting of said resinous material, all of said steps being accomplished while continuously maintaining said sheets and board in a heated state and advancing the same at a substantially uniform speed.

6. The continuous process of making a substantially rigid, laminated board from a plurality of flexible sheets of fibrous material, comprising the steps of continuously advancing said sheets, treating each face of each sheet with a molten resinous solution, subjecting said sheets separately to a roller pressure of at least 100 pounds per lineal inch of width thereof to force said solution into said sheets to impregnate the same throughout and remove excess solution therefrom, applying a molten thermosetting resinous solution to at least one of each two opposing faces of each sheet, heating said sheets substantially simultaneously while maintained in spaced relation with one another, sufficiently to advance the cure of said thermosetting solution to a tacky state and commence the setting thereof, combining said sheets by roller pressure of at least 50 pounds per lineal inch of width thereof to form a board and continuing the application of heat thereto to complete the thermosetting of said resinous material, all of said steps being accomplished while continuously maintaining said sheets and board in a heated state and advancing the same at a substantially uniform speed.

7. The continuous process of making a laminated board from a plurality of sheets of fibrous material, comprising the steps of continuously advancing said sheets, treating each sheet with a resinous solution, subjecting said sheets to a roller pressure sufficient to force said solution into said sheets to impregnate the same throughout and remove excess solution therefrom, applying a thermosetting resinous solution to at least one of each two opposing faces of each sheet, heating said sheets while maintained in spaced relation with one another, sufficiently to advance the cure of said thermosetting solution to a tacky state and commence the setting thereof, combining said sheets by roller pressure to form a board, applying a coating of thermosetting resinous material to at least one of the exposed faces of said board, and continuing the heating of said board to set said surface coating and complete the cure of thermosetting solution applied between said sheets, all of said steps being accomplished while continuously maintaining said sheets and board in a heated state and advancing the same at a substantially uniform speed.

8. The continuous process of making a laminated board from a plurality of sheets of fibrous material, comprising the steps of continuously advancing said sheets, treating each sheet with a resinous solution, subjecting said sheets to a roller pressure sufficient to force said solution into said sheets to impregnate the same throughout and remove excess solution therefrom, applying a thermosetting resinous solution to at least one of each two opposing faces of each sheet and to at least one of the outer exposed faces of the outer of said sheets, combining said sheets by pressure to form a board while heating the same to effect the setting of said thermosetting solution, all of said steps being accomplished while continuously maintaining said sheets and board in a heated state and advancing the same at a substantially uniform speed.

9. The continuous process of making a rigid, laminated board from a plurality of sheets of dense, fibrous material, comprising the steps of continuously advancing said sheets, treating said sheets with a molten, thermoplastic, resinous solution, subjecting said sheets separately to heat and pressure sufficient to force said solution into said sheets to thoroughly impregnate the same, coating at least one interior face of each of said sheets with a molten, thermosetting, resinous solution while said thermoplastic solution is still in a heated liquid, or semi-liquid state, for tenaciously bonding said sheets together, continuing the heating of said sheets while in spaced relation with one another to advance the cure of said thermosetting solution to a tacky state and commence the setting thereof, combining said sheets under pressure at the point in the travel thereof at which said thermosetting solution acquires a tacky state and before contact thereof with a supporting surface, and continuously heating and pressing said combined sheets through a substantial period of travel to simultaneously effect the curing of said thermoplastic and thermosetting solutions, all of said steps being accomplished while continuously maintaining said sheets and board in a heated state and advancing the same at a substantially uniform speed.

10. The continuous process of making a rigid, laminated board from a plurality of sheets of dense, fibrous material, comprising the steps of continuously advancing said sheets in spaced, substantially parallel relation with one another, treating said sheets with a molten, thermoplastic, resinous solution, subjecting said sheets to heat and pressure sufficient to force said solution into said sheets to thoroughly impregnate the same, coating at least one interior face of each of said sheets with a molten, thermosetting, resinous solution, while said thermoplastic solution is still in a heated liquid, or semi-liquid state, for tenaciously bonding said sheets together, continuing the heating of said sheets by the application thereto of uniform heat for a substantial period of travel to uniformly advance the cure of said thermosetting solution to a tacky state and commence the setting thereof, combining said sheets under pressure at the point in the travel thereof at which said thermosetting solution acquires a tacky state and before contact thereof with a supporting surface, and continuously heating and pressing said bonded sheets through a substantial period of travel to simultaneously effect the curing of said thermoplastic and thermosetting solutions and convert said bonded sheets into a substantially rigid board, all of said steps being accomplished while continuously maintaining said sheets and board in a heated state and advancing the same at a substantially uniform speed.

11. The continuous process of making a rigid, laminated board from a plurality of sheets of dense, fibrous material, comprising the steps of continuously advancing said sheets, treating said sheets with a molten, thermoplastic, resinous solution, subjecting said sheets to heat and pressure sufficient to force said solution into said sheets to thoroughly impregnate the same, coating at least one interior face of each of said sheets with a molten, thermosetting, resinous solution, while said thermoplastic solution is still in a heated liquid, or semi-liquid state, for tenaciously bonding said sheets together, coating the exterior face of at least one exterior sheet with a molten, thermosetting, resinous solution and continuously heating and pressing said sheets together through a substantial period of travel to effect the simultaneous and uniform curing of all of said solutions, all of said steps being accomplished while continuously maintaining said sheets and board in a heated state and advancing the same at a substantially uniform speed.

12. The continuous process of making a rigid, laminated board from a plurality of sheets of dense, fibrous material, comprising the steps of continuously advancing said sheets in spaced, substantially parallel relation with one another, treating said sheets with a molten, thermoplastic, resinous solution, subjecting said sheets to heat and pressure sufficient to force said solution into said sheets to thoroughly impregnate the same, coating at least one interior face of each of said sheets with a molten, thermosetting, resinous solution, while said thermoplastic solution is still in a heated liquid, or semi-liquid state, for tenaciously bonding said sheets together, continuing the heating of said sheets by the application thereto of uniform heat for a substantial period of travel to uniformly advance the cure of said thermosetting solution to a tacky state and commence the setting thereof, combining said sheets under pressure at the point in the travel thereof at which said thermosetting solution acquires a tacky state and before contact thereof with a supporting surface, coating the exterior face of at least one exterior sheet with a molten, thermosetting, resinous solution, and continuing the heating and pressing of said sheets together through a substantial period of travel to effect the simultaneous and uniform curing of all of said solutions, all of said steps being accomplished while continuously maintaining said sheets and boards in a heated state and advancing the same at a substantially uniform speed.

13. A unitary machine for continuously producing a rigid, laminated board from a plurality of sheets of dense, fibrous material, comprising means for continuously advancing said sheets in spaced relation with one another, treating means for applying a molten, thermoplastic, resinous solution to said sheets, heated pressure rolls for forcing said solution into said sheets to thoroughly impregnate the same, treating means arranged to apply a molten, thermosetting, resinous solution to at least one interior face of each of said sheets at a point at which said thermoplastic solution of each of said sheets is still in a heated liquid, or semi-liquid state, for tenaciously bonding said sheets together, a heating element for simultaneously and uniformly heating said sheets while in spaced relation with one another to advance the cure of said thermosetting solution to a tacky state and commence the setting thereof, pressure rolls for combining said sheets at the point of travel thereof at which said thermosetting solution acquires a tacky state, and means for continuously heating and pressing said combined sheets through a substantial path of travel in said machine to simultaneously effect the curing of said thermoplastic and thermosetting solutions, all of said parts being arranged and operating to continuously maintain said sheets and board in a heated, curing state and advance the same at a substantially uniform speed through the machine.

14. A unitary machine for continuously producing a rigid, laminated board from a plurality of sheets of dense, fibrous material, comprising means for continuously advancing said sheets in spaced, substantially parallel relation with one another, treating means for applying a molten, thermoplastic, resinous solution to said sheets, heated pressure rolls for forcing said solution into said sheets to thoroughly impregnate the same, treating means arranged to apply a molten, thermosetting, resinous solution to at least one interior face of each of said sheets at a point at which said thermoplastic solution of each of said sheets is still in a heated liquid, or semi-liquid state, treating means for applying a molten, thermosetting, resinous solution to the exterior face of at least one exterior sheet to provide a finished surface for said board, and means for continuously heating and pressing said sheets together through a substantial path of travel in said machine to simultaneously effect the curing of all of said solutions, all of said parts being arranged and operating to continuously maintain said sheets and board in a heated, curing state and advance the same at a substantially uniform speed through the machine.

15. A unitary machine for continuously producing a rigid, laminated board from a plurality of sheets of dense, fibrous material, comprising means for continuously advancing said sheets in spaced relation with one another, treating means for applying a molten, thermoplastic, resinous solution to said sheets, heated pressure rolls for forcing said solution into said sheets to thoroughly impregnate the same, treating means arranged to apply a molten, thermosetting, resinous solution to at least one interior face of each of said sheets at a point at which said thermoplastic solution of each of said sheets is still in a heated liquid, or semi-liquid state, for tenaciously bonding said sheets together, a heating element for simultaneously and uniformly heating said sheets while in spaced relation with one another to advance the cure of said thermosetting solution to a tacky state and commence the setting thereof, pressure rolls for combining said sheets at the point of travel thereof at which said thermosetting solution acquires a tacky state, treating means for applying a molten, thermoplastic, resinous solution to the exterior face of at least one exterior sheet to provide a finished surface for said board, and means for continuously heating and pressing said combined and coated sheets through a substantial path of travel in said machine to simultaneously effect the curing of said thermoplastic and thermosetting solutions, all of said parts being arranged and operating to continuously maintain said sheets and board in a heated, curing state and advance the same at a substantially uniform speed through the machine.

CHARLES A. UPSON.

REFERENCES CITED

The following references are of record in the file of this patent:

UNITED STATES PATENTS

| Number | Name | Date |
| --- | --- | --- |
| 2,224,992 | Sutherland | Dec. 17, 1940 |
| 1,799,506 | Frederick | Apr. 7, 1931 |
| 1,361,970 | Dickey | Dec. 14, 1920 |
| 1,318,742 | Frederick | Oct. 14, 1919 |
| 1,787,404 | Taylor | Dec. 30, 1930 |
| 1,551,318 | Logan | Aug. 25, 1925 |
| 631,743 | Gardner | Aug. 22, 1899 |
| 1,312,682 | Clapp | Aug. 12, 1919 |
| 318,910 | Jowitt | May 26, 1885 |
| 2,082,854 | Sutherland | June 8, 1932 |

FOREIGN PATENTS

| Number | Country | Date |
| --- | --- | --- |
| 3679/26 | Australia | Sept. 6, 1926 |